United States Patent Office 3,201,196
Patented Aug. 17, 1965

3,201,196
FIBROUS SODIUM METAL SILICATES
Thurman E. Gier, Wilmington, Del., assignor to E. I. du Pont de Nemours and Company, Wilmington, Del., a corporation of Delaware
No Drawing. Filed July 18, 1962, Ser. No. 210,846
21 Claims. (Cl. 23—110)

This application is a continuation-in-part of my copending application Serial No. 128,969, filed August 3, 1961, and now abandoned.

This invention relates to, and has as its principal objects provision of, novel inorganic compounds, crystalline forms of these compounds, articles of manufacture made therefrom, and methods of preparing all of the same.

Inorganic filamentary materials are useful in such fields of application as thermal insulation, reinforcing agents for plastics, binders for paper products, and the like, and a number of such materials, both natural and synthetic, are known. Synthetic fibers include continuous filament and staple forms illustrated by glass and potassium titanate fibers, respectively. The natural products are found as staple fiber and may be exemplified by the naturally occurring asbestiform minerals with monoclinic or orthorhombic crystal structures such as tremolite, amosite, crocidolite and anthophyllite. These minerals occur as long silky fibers which, however, are too brittle for textile use. The best of the naturally occurring asbestiform minerals, chrysotile asbestos, is nevertheless brittle and difficult to handle without breakage. Although these filamentary materials can be formed into felted or matted structures and, in some cases, can be twisted into relatively weak threads, the fibers are friable and can readily be reduced to powder by rubbing between the fingers. To produce yarns tough enough to withstand commercial textile processes, an organic fiber such as cotton or rayon must be mixed with the "asbestos" fibers.

The present invention provides synthetic inorganic fibers of novel composition, which are tough and resistant to powdering, in the form of fibrous single crystals of sodium metal silicate. In general, these fibers contain sodium, hydrogen, at least one metal of the group Mg, Co, and Ni, hydroxyl and/or fluorine and silicon in the proportions, on an atom basis per 8 parts of Si, 1.5–3.0 parts Na, 0.2–2.0 parts H, 5.0–6.0 parts metal, 2.0 parts total of hydroxyl and fluorine, the hydroxyl and fluorine individually being in the proportions of 0–2 parts, and oxygen sufficient to provide statistical neutrality in the fibers.

The fibers of this invention are prepared by hydrothermal treatment at a temperature of about 300–900° C. under a pressure of at least 300 atmospheres of an aqueous mixture having a pH of at least 9 and containing compounds supplying sodium, magnesium, cobalt and/or nickel, and silicate ions in selected proportions. In a preferred modification, fluoride ion is also present in the reaction mixture. The reaction, of course, is carried out in pressure vessels inert to the reactants under the conditions employed.

The fibers are tough and flexible and can be twisted together readily to form strong threads and yarns. The fibers have a cross-sectional dimension in the range of 0.01–5 microns and an axial ratio, i.e., a ratio of length to cross-sectional dimension, of at least 1000:1. The axial ratio of the fibers is, in fact, generally in the range 5000:1 to 50,000:1 and may be as high as 200,000:1, or even higher. The magnesium-containing fibers are colorless, while those containing major proportions of nickel are green and of cobalt pink.

The silicate fibers of this invention possess excellent resistance to attack by chemical agents as indicated by the fact that 12-hour immersion in hot concentrated potassium hydroxide is without effect. The fibers also possess a high degree of thermal stability, retaining strength and flexibility to temperatures as high as 700° C. Water loss at elevated temperature is very low, only 1–2% loss occurring during two hours' heating at 600° C. Ability to withstand high temperatures is improved by the presence of fluorine in the fibers as shown by the fact that fluorine-containing fibers are essentially unchanged after heating at 920° C.

In one embodiment the fibers of this invention are characterized by an X-ray diffraction pattern containing reflections corresponding to $d$ spacings of 9.205, 2.612, and 2.520 A. The 14 strongest lines of this pattern are listed in Table I below. It will be understood that minor changes in the relative position of the reflections can occur as a result of changes in composition. Such changes in position do not exceed ±0.1 A. from the values shown in Table I. These fibers, hereinafter referred to for convenience as $x$ fibers, are usually ribbon-like in form and have a cross-sectional dimension, i.e., the dimension corresponding to the width of the ribbon, in the range of 0.01–1.0 micron. Such fibers exhibit surface areas ranging up to 50 sq. m./g. Under conditions leading to extensive introduction of fluorine, it is possible to prepare $x$ fibers containing a higher proportion of fluorine than is indicated by the above discussion.

TABLE I

X-ray pattern of sodium magnesium silicate fibers of type $x$

| Intensity:[1] | "$d$" Spacing [2] |
|---|---|
| S | 9.205 |
| M₃ | 4.897 |
| M₃ | 4.716 |
| M₂ | 4.525 |
| M₃ | 4.073 |
| M₃ | 4.001 |
| M₃ | 3.559 |
| M₂ | 3.299 |
| M₂ | 3.218 |
| F | 3.045 |
| M₂ | 2.995 |
| M₃ | 2.794 |
| S | 2.612 |
| S | 2.520 |

[1] Relative intensity of the reflection using Cu radiation; S indicates the strongest lines in the pattern; M₁–M₃ indicate lines of medium intensity, decreasing from M₁ to M₃; F indicates faint lines.
[2] Interplanar spacing in angstrom units.

The $x$ fibers are converted on hydrothermal treatment as described more fully below to fibers ($y$ fibers) corresponding to the formula $Na_xH_yM_z(Si_4O_{11})_2X_mX'_n$, where M is Mg and/or Co and/or Ni, X and X' are OH or F, $x$ is 1.5–3.0, $y$ is 0.2–2.0, $z$ is 5.0–6.0, $m$ and $n$ individually are in the range of 0–2, $n+m=2$, and $x+y+2z=14$. These fibers usually have a cross-sectional dimension of 1 micron and above, and appear to be approximately square or round in cross-section. The surface area is smaller than in the case of $x$ fibers and usually is about 5–15 sq.m./g. for sodium magnesium silicate fibers of type $y$. The density of such fibers is normally about 3 or slightly higher. A typical X-ray pattern is shown in Table II following Example I, below.

The $y$ fibers include fibers represented by the formula $Na_2H_2M_5(Si_4O_{11})_2X_mX'_n$, where M is a divalent metal of the group Co, Mg, Ni and mixtures thereof, X and X' are selected from hydroxyl and fluorine groups, $m$ and $n$ have values between 0 and 2, including both limits, and the sum of $m$ and $n$ is 2. For example, X may be OH, X' may be F, and $m$ and $n$ may each be 1 as in the composition $Na_2H_2Mg_5(Si_4O_{11})_2OHF$. When X and X' are alike, the composition may be represented by $Na_2H_2M_5(Si_4O_{11})_2X_2$. Examples of such compositions are $Na_2H_2Ni_5(Si_4O_{11})_2(OH)_2$ and $$Na_2H_2Mg_5(Si_4O_{11})_2F_2$$

Intermediate compositions can also be prepared and have desirable fiber properties.

In a typical preparation, the reactants and water in selected proportions, as described below, are placed in a flexible-walled vessel which is then hermetically sealed and introduced into a container capable of withstanding high pressure. Water or another fluid is injected into the container until the desired pressure has been reached, this pressure being transmitted to the reactants through the flexible walls of the containing vessel, and the assembly is then heated to reaction temperature. At the end of the reaction period, the assembly is cooled to room temperature, the pressure being released during the latter stages of cooling, i.e., after a temperature below about 200° C. has been reached. After cooling, the flexible-walled reaction vessel is removed from the pressure container and opened.

Sodium metal silicate fibers are produced ranging up to 4 inches or more in length. The longest fibers usually occur in the form of a loose mass resembling a cotton boll. Shorter fibers are found consolidated into a dense mass. The fibers are removed from the reaction vessel and washed with water, any fiber mass being broken up by vigorous agitation. The separated fibers are then filtered from the aqueous slurry and dried. Filtration can be carried out with a large mesh screen which will pass any water-insoluble, granular particles accompanying the fibers. The fibers are normally free of such particles, however, since the usual by-products are water-soluble materials. The dried fibers may be utilized as desired.

Compounds which provide magnesium, nickel and/or cobalt, sodium, silicate hydroxyl and/or fluoride ions are employed as starting materials in the process of this invention. Silica ($SiO_2$) or a silicate, such as sodium, magnesium or nickel silicate, is a convenient source of silicate ion. Magnesium, cobalt and nickel, if not introduced as silicate, can be provided as oxide, or as a salt such as halide, nitrate and the like. Sodium hydroxide can be used as a source of sodium ion or sodium can be introduced as sodium silicate or sodium fluoride. Fluoride ion is usually introduced in the form of sodium fluoride but can be provided in other forms, e.g., as magnesium fluoride or sodium fluorosilicate. Although commercial grades of the reactants can be employed, it is desirable to avoid excessive contamination of the reaction mixture with other ions.

The atom ratio of silicon to the metal M, i.e., magnesium, cobalt and/or nickel, in the reaction mixture is chosen in the range 1:1 to 8:1, generally in the range 1.5:1 to 5:1. Long fibers with high axial ratios are produced from mixtures containing approximately three silicon atoms for each metal atom. The ratio of sodium to silicon in the fibers is sometimes as low as 3:16 and synthesis mixtures containing sodium and silicon in this proportion can be employed by using potassium hydroxide to provide the desired alkalinity. However, it is often convenient to employ sodium ion for this purpose. When this is done an excess of sodium ion is required in the synthesis mixture. The sodium ion usually is employed in the proportion of approximately 1–3 atoms of sodium per atom of silicon. Based on magnesium, sodium ion is used in the proportion 1:16 to 16:1. It is preferred that the overall sodium:metal:silicate (or silicon) ratio range from 2:1:1.5 to 8:1:8. However, when metal compounds other than oxide or hydroxide are used, e.g., $MgCl_2$ or $NiCl_2$, larger proportions of sodium hydroxide may be required. It is preferred that sufficient $OH^-$ ion be present to keep silicon compounds in solution. When magnesium is present, fluoride ion, if employed, is generally present in the proportions based on silicon of 1:1 to 3:1; in the preparation of nickel and cobalt silicate fibers, higher proportions up to about 10:1 (F:Si) can be used.

The pH of the aqueous reaction mixture must be at least 9 and is preferably 11 or higher. The proportion of water employed can vary within wide limits. Satisfactory fibers are obtained using small proportions, i.e., a weight ratio of water to total solids of 1:1, or much larger proportions, i.e., a ratio of 100:1. Water of hydration in the reactants is included in calculating these proportions. Utilization of the high pressure equipment employed is most efficient when the proportion of reaction medium is relatively low and weight ratios of medium to reactants in the range of 1:1 to 10:1 are therefore preferred.

Formation of sodium magnesium silicate fibers of type $x$ is favored by use of a low reaction temperature, i.e., a temperature of about 600° C. and below. At higher temperatures, other factors, i.e., proportion of alkali in the charge, presence of fluorine and reaction time also influence $x$ fiber production. For example, at 700° C. $x$ fiber is produced when a reaction time of 15 minutes is employed and the Na:Si:Mg ratio is 3:2:1, while $y$ fiber is formed at a reaction time of 1 hour. At low Na:Si ratios $x$ fiber is formed even on prolonged heating. The presence of fluoride also facilitates production of $x$ fiber as indicated by the fact that with fluoride present $x$ fiber is formed under all the conditions enumerated in the foregoing. If reaction time is prolonged to 24 hours at 700° C. $y$ fiber is produced even in the presence of fluoride although often admixed with $x$ fiber. At higher temperatures production of $y$ fiber becomes progressively easier. The effect of alkali in the presence of fluoride is similar to the effect when fluoride is absent. For preparation of sodium magnesium silicate fibers of the $x$-type, it is preferred to operate at a temperature of 600° C. or below at a pressure of 500–2000 atmospheres while for preparation of fibers of the $y$-type a temperature of at least 700° C. and a pressure of at least 2500 atmospheres is preferred.

The presence of nickel favors formation of $x$-type fiber and a temperature of 700° C. or more for at least 6 hours with a strongly basic medium is required for production of sodium nickel silicate fiber of type $y$. On the other hand, sodium cobalt silicate fiber of the $y$-type is easily made and the very mild conditions such as 500° C. for 1 hour with a low concentration of alkali must be used to prepare cobalt-containing $x$-type fiber. In general, conditions which favor direct production of $y$-fiber can be used for conversion of $x$-fiber to $y$-fiber.

Any combination of temperature and pressure within the broad limits stated above can be employed. In general, however, the higher the pressure within the stated range, the higher the temperature that will be used, the conditions being so chosen that a fluid phase of adequate density is present. At temperatures near the lower end of the operable range, i.e., below about 500° C., pressures of 1000 atmospheres and below will ordinarily be employed. For example, fibers are produced at 450° C. under a pressure of 500 atmospheres. Under such conditions, however, relatively long reaction periods, i.e., up to 100 hours or more, are often required. For rapid production of fibers containing a high proportion of long staple, temperatures in the range of 650–800° C. and pressures of 1000–4000 atmospheres or higher are desirable. Preparations carried out under these conditions are complete after 1–12 hours and in some instances require only a few minutes, i.e., 10–15 minutes, for completion.

The rate of cooling has been observed to have some effect on the length of fiber obtained, the longest fibers resulting at the relatively slower rates. A cooling rate of about 50° C. per hour gives good results.

The preparation and properties of the novel silicates of this invention and of the fibers produced therefrom are illustrated in the following nonlimiting examples. Cross-sectional dimension is usually determined from electron micrographs of the fibers. Preparation of the specimen includes a step in which fibers are deposited from suspension in a liquid such as water onto a support. Ribbon-like fibers with generally oval or rectangular cross-sections tend to be oriented during this step so that the longest dimension of the cross-section is parallel to the surface of the support and is the cross-sectional dimension observed.

EXAMPLE I

Magnesium oxide, sodium silicate ($Na_2SiO_3 \cdot 9H_2O$) and sodium hydroxide in proportions corresponding to Mg:Si:Na ratios on an atomic basis of 1:1.5:4.25 were placed in a flexible platinum vessel (tube) with 290% by weight, based on the weight of the solid reactants, of water. The aqueous mixture had a pH value above 11. The vessel was sealed and introduced into a container capable of withstanding high pressure. The container was pressurized with argon at 3000 atmospheres and, with its contents, heated at 700° C. for six hours. After a cooling period of 8½ hours and release of pressure the container was opened and the platinum vessel withdrawn and opened.

The upper portion of the vessel cotnained long silky fibers ranging up to about 3 inches in length. These fibers were examined by X-ray diffraction and gave a distinctive powder pattern (see Table II below). This pattern is consistent with a monoclinic crystal structure having cell constants of $a = 9.88 \pm 0.10$ A., $b_0 = 18.04 \pm 0.10$ A., $c_0 = 5.29 \pm 0.10$ A. and $\beta = 103°5' \pm 30'$. The lower portion of the reaction vessel contained a compact mass of shorter fibers. A woven fabric was made from threads obtained by twisting together the long fibers.

TABLE II

*X-ray pattern of sodium magnesium silicate fibers of type y*

| Intensity:[1] | "d" Spacing[2] |
|---|---|
| $M_2$ | 8.50 |
| $M_3$ | 4.82 |
| $M_2$ | 4.49 |
| F | 4.02 |
| $M_3$ | 3.83 |
| $M_2$ | 3.40 |
| $M_3$ | 3.28 |
| $M_1$ | 3.14 |
| $M_3$ | 2.98 |
| F | 2.83 |
| S | 2.73 |
| $M_3$ | 2.57 |
| $M_1$ | 2.50 |
| F | 2.40 |
| $M_3$ | 2.32 |
| $M_2$ | 2.25 |
| $M_2$ | 2.16 |
| $M_3$ | 2.07 |
| $M_3$ | 1.95 |
| $M_3$ | 1.90 |
| F | 1.84 |
| F | 1.82 |
| F | 1.80 |
| $M_3$ | 1.66 |
| $M_3$ | 1.61 |
| $M_3$ | 1.57 |

[1] Relative intensity of the reflection using Cu radiation; S indicates the strongest line in the pattern; $M_1$–$M_3$ indicate lines of medium intensity decreasing from $M_1$ to $M_3$; F indicates faint lines.
[2] Interplanar spacing in angstrom units.

EXAMPLE II

A mixture of magnesium oxide, sodium silicate nonahydrate and sodium hydroxide containing magnesium, silicon and sodium in the atomic ratios of 1:2:5 and 170% water was treated as described in Example I. The pH of the aqueous mixture was above 11. The fiber product, after washing with water and drying, was analyzed with the following results (analyses are in weight percent). Found: Na, 6.3; Mg, 15.75; Si, 28.52. This analysis corresponds to $Na_{2.16}H_{1.64}Mg_{5.1}(Si_4O_{11})_2(OH)_2$. The product was y-fiber and consisted of fiber "balls" with a diameter of about ¼", composed of masses of closely knit fibers. From the lower portion of the tube, a "corky" solid was recovered composed principally of shorter fibers (1–10 mm. long).

EXAMPLE III

A mixture containing $Mg(OH)_2$, $SiO_2$ and NaOH in quantities such that the atomic ratios of magnesium, silicon and sodium were 1:3:5 and water in an amount of 145% by weight based on the dry reactants was heated under pressure as described in Example I. The reaction mixture had a pH above 11. At the end of the heating period, the reaction mixture was cooled at a rate of 50° C. per hour to 150° C. and then, after pressure release, rapidly cooled (0.5 hour) to room temperature. Fine, long silky fibers of sodium magnesium silicate (y-fiber) ranging up to 4" in length were obtained in good yield. These fibers exhibited axial ratios ranging up to 200,000:1.

EXAMPLE IV

A. A mixture of 10 cc. of 1 M $MgCl_2$ solution, 45 cc. of water, 10 cc. of 2 M sodium silicate solution, 5 cc. of 2 N NaOH solution, and 2.52 g. of NaF was prepared, the components being added in the order named. After sealing in a platinum tube, the mixture was heated for 6 hours at 700° C. under 3000 atmospheres pressure. The product obtained was a fluorine-containing silicate fiber of the y-type as indicated by the X-ray diffraction pattern. Analysis indicated the following composition: Na, 4.9; Mg, 16.76; Si, 27.14; F, 2.92. After correction for moisture on the fibers, this analysis corresponds to $Na_{1.74}H_{0.86}Mg_{5.7}(Si_4O_{11})_2F_{1.27}(OH)_{0.73}$.

B. In a similar manner, a mixture of 15 cc. of 1 M $MgCl_2$, 15 cc. of 2 M sodium silicate, 7.5 cc. of 2 N NaOH, 15 cc. of 1 M NaF, and 10 cc. of water was converted to fluorine-containing fibers of the y-type, exhibiting the composition by analysis: Na, 6.0; Mg, 15.91; Si, 28.2; F, 1.58. After correction for moisture of the fibers, this analysis corresponds to $Na_{2.08}H_{1.56}Mg_{5.18}(Si_4O_{11})_2F_{0.66}(OH)_{1.34}$.

C. In another preparation, carried out with no free NaOH present, magnesium oxide, silica and sodium fluoride were mixed in proportions to give a composition in which the atomic ratios of Mg:Si:Na:F were 1:1.5:5:5. This mixture and 455% of water (by weight based on weight of the mixture) was heated under pressure as described in Example I. Long, tough fibers were produced which on microscopic examination were observed to be identical in crystal form to the product of Example I. These fibers ranged up to about 1" in length and had axial ratios up to 50,000 to 100,000:1. X-ray examination indicated that these fluorine-containing fibers were a mixture of x- and y-type as indicated by the interplanar spacings observed. Intensities of the lines in the X-ray pattern differed from those observed in the pattern of the product of Example I as a result of the presence of fluorine in the crystal lattice.

EXAMPLES V–XII

These examples illustrate the preparation of sodium magnesium silicate and fluorine-containing sodium magnesium silicate fibers under various conditions of temperature and pressure. The reactants employed and the reaction conditions are summarized in Table III. In each instance, long tough fibers were produced. The fibers of Examples V and XII were x-type, and those of Examples VI and VIII–XI were y-type.

TABLE III

| Ex. No. | Reactants [1] | Mg:Si:Na:F Atomic Ratio | Water [2] percent | Reaction Conditions [3] | |
|---|---|---|---|---|---|
| | | | | Temp. (° C.) | Pres. (atm.) |
| V | MgO, SiO$_2$, NaOH | 1:1.5:1.25:0 | 830 | 500 | 1,000 |
| VI | Mg(OH)$_2$, SiO$_2$, NaOH | 1:3:3.5:0 | 270 | 600 | 4,000 |
| VII | Mg(OH)$_2$, SiO$_2$, Na$_2$CO$_3$ | 1:3:4:0 | 670 | 700 | 3,000 |
| VIII | Mg(OH)$_2$, Na$_2$SiO$_3$·9H$_2$O | 1:8:16:0 | [4] 191 | 700 | 3,000 |
| IX | Mg(OH)$_2$, SiO$_2$, NaF | 16:16:1:1 | 1,250 | 700 | 3,000 |
| X | Mg(OH)$_2$, SiO$_2$, NaF | 1:1.5:5:5 | 420 | 650 | 4,000 |
| XI [5] | Mg(OH)$_2$, Na$_2$SiO$_3$·9H$_2$O | 1:5:10:0 | 495 | 700 | 3,000 |
| XII | Mg(OH)$_2$, SiO$_2$, NaF | 1:3:10:10 | 228 | 450 | 500 |

[1] The pH of the reaction mixture in Example VII was 9; in other examples the pH was above 11.
[2] Percent by weight based on total reactants.
[3] Reaction conditions were maintained for 6 hours, except in Example XII where a 24 hour reaction period was employed.
[4] Not including water introduced as Na$_2$SiO$_3$·9H$_2$O.
[5] After the heating period, cooling was at 50° C./hr. The sodium magnesium silicate fibers produced had a density of 2.91 g./cc.

EXAMPLE XIII

A mixture of 5.94 g. of nickel chloride hexahydrate in 25 cc. of water, 14.2 g. of Na$_2$SiO$_3$·9H$_2$O diluted to 40 cc. with water and 1.5 g. of silica was heated in a sealed platinum tube at 700° C. under 3000 atmospheres pressure for 6 hours. This mixture contained nickel, silicon and sodium in the proportions on an atomic basis of 1:3:4 and had a pH above 11. The product was a spongy mass of tough, flexible, green fibers of the $x$-type up to 3 inches in length.

In another preparation, white-light green, strong, fibers were obtained by heating together Mg(OH)$_2$, Ni(NO$_3$)$_2$·6H$_2$O, and Na$_2$SiO$_3$·9H$_2$O at a temperature of 700° C. under a pressure of 3000 atmospheres for 6 hours. The reactants were employed in proportions such that the atomic ratio of Ni:Mg:Si:Na was 1:2:9:18. Besides water of hydration in the reactants, 169% by weight of water based on total weight of reactants was added to the reaction mixture.

In a further preparation a mixture of 20 cc. of 1 M nickelous chloride solution, 7.4 cc. of silica sol (15.2% SiO$_2$, 0.1% Na$_2$O) and 30 cc. of 2 M sodium silicate solution were heated in a sealed platinum tube at 700° C. for 8 hours under 3000 atmospheres pressure. The product was a spongy bundle of green fibers containing by analysis Na, 5.1; Ni, 32.77; Si, 22.19. The X-ray diffraction pattern of this product showed it to be composed of $x$-type fibers.

EXAMPLE XIV

A sodium cobalt silicate fiber was prepared as follows: A mixture of 25 mmoles cobaltous chloride hexahydrate in 25 cc. of water, 40 mmoles of sodium silicate nonahydrate diluted to 40 cc. with water, and 12.5 mmoles of silica was heated at 700° C. under 3000 atmospheres pressure for 6 hours in a sealed platinum tube. The reaction mixture had a pH above 11. The fibrous product was pink in color and consisted of long, tough, flexible fibers of the $y$-type. After heating in concentrated (approximately 37%) hydrochloric acid for 60 hours at steam bath temperature these fibers retained the fiber form and crystal structure, but lost some weight. During this treatment, the liquid acquired a faint blue coloration. X-ray study of the fibrous product after this acid treatment indicated a monoclinic crystal structure with a repeat distance along the fiber axis ($c_0$) of 5.29±0.10 A. The x-ray pattern is shown in Table IV.

Pink, pillable fibers of the $y$-type were also obtained by heating a mixture of cobalt oxide (Co$_2$O$_3$, 0.5 millimole), sodium fluoride (15 millimoles), and silica (2 millimoles) in 3 cc. of water at 700° C. under 3000 atmospheres pressure for 6 hours.

TABLE IV

X-ray pattern of sodium cobalt silicate fibers

| Intensity [1] | "$d$" Spacing [2] | Intensity [1] | "$d$" Spacing [2] |
|---|---|---|---|
| S | 8.49 | M$_1$ | 2.19 |
| M$_3$ | 4.80 | F | 2.12 |
| M$_3$ | 4.53 | M$_3$ | 2.08 |
| M$_3$ | 4.05 | M$_3$ | 2.04 |
| M$_3$ | 3.86 | M$_3$ | 1.99 |
| F | 3.65 | M$_3$ | 1.97 |
| M$_2$ | 3.42 | M$_3$ | 1.87 |
| M$_3$ | 3.30 | M$_3$ | 1.81 |
| M$_1$ | 3.14 | M$_3$ | 1.72 |
| M$_3$ | 2.99 | M$_4$ | 1.69 |
| M$_3$ | 2.83 | M$_3$ | 1.67 |
| S | 2.73 | F | 1.64 |
| S | 2.60 | M$_3$ | 1.62 |
| S | 2.51 | F | 1.60 |
| M$_3$ | 2.40 | M$_2$ | 1.58 |
| M$_3$ | 2.32 | M$_2$ | 1.51 |
| M$_4$ | 2.31 | | |
| M$_3$ | 2.25 | | |

[1] Relative intensity of the reflection using cobalt radiation; S indicates the strongest line in the pattern, M$_1$–M$_4$ indicate lines of medium intensity, decreasing from M$_1$ to M$_4$; F indicates faint lines.
[2] Interplanar spacing in angstrom units.

EXAMPLE XV

A mixture of 6.4 g. of sodium silicate nonahydrate, 1.68 g. of silicic acid (SiO$_2$·15% H$_2$O), 11.3 cc. of 2 M NaOH solution, 7.0 cc. of 25% by weight MgCl$_2$ solution, and 50 cc. of water was prepared by dissolving the sodium silicate, silicic acid and sodium hydroxide in a small quantity of the water by warming and then adding the remaining water and magnesium chloride solution. The gelatinous precipitate was broken up by stirring and the mixture was hermetically sealed in a platinum tube. The tube was shaken vigorously to further disperse the precipitated material and then tube and contents were heated at 700° C. under 3000 atmospheres pressure for 6 hours. After cooling, the pressure was released, the tube opened, and the contents washed with water and acetone. The acetone was allowed to evaporate leaving a mass of fibers identified by X-ray diffraction as being of the $y$-type, and having cross-sectional dimensions in the range of 0.01–1 micron. Analysis indicated the following composition: Na, 6.1; Mg, 16.90; Si, 28.32. This corresponds to Na$_{2.16}$H$_{0.78}$Mg$_{5.53}$(Si$_4$O$_{11}$)$_2$(OH)$_2$.

EXAMPLE XVI

This example illustrates the preparation of sodium cobalt silicate fibers of the $y$-type. A mixture containing 25 cc. of 1 M CoCl$_2$ solution, 9.1 cc. of silica sol (15.2% by weight SiO$_2$ and 0.1% Na$_2$O), 25 cc. of 2 M sodium silicate solution, and 10 cc. of water was heated in a sealed platinum tube at 575° C. for 6 hours under 2000 atmospheres pressure. The fibrous product contained by analysis Na, 5.7; Co, 32.58; Si, 22.84, corresponding to Na$_{2.44}$H$_{0.74}$Co$_{5.41}$(Si$_4$O$_{11}$)$_2$(OH)$_2$.

EXAMPLE XVII

Fluorinated sodium cobalt silicate fibers of the y-type were prepared from a mixture containing 1 cc. of 1 M cobaltous chloride solution, 0.5 cc. of 2 M sodium silicate solution, 0.37 cc. of silica sol, and 0.21 g. of sodium fluoride by heating in a sealed platinum tube at 700° C. under 3000 atmospheres pressure for 6 hours. Pink fibers were obtained which were shown by X-ray diffraction analysis to be of the y-type.

EXAMPLE XVIII

This example illustrates the preparation of sodium cobalt magnesium silicate fibers. The preparation was carried out as described in Example XVII, using a mixture containing 10 cc. of 1 M magnesium chloride solution, 10 cc. of 1 M cobaltous chloride solution, 7.4 cc. of silica sol, and 20 cc. of 2 M sodium silicate solution. The product consisted of light pink fibers having a composition by analysis: Na, 5.6; Mg, 8.16; Co, 18.46; Si, 25.16. This analysis corresponds to

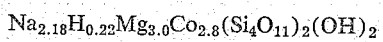

$$Na_{2.18}H_{0.22}Mg_{3.0}Co_{2.8}(Si_4O_{11})_2(OH)_2$$

The fibers had a refractive index, determined by the Becke line technique, of 1.64, as compared to refractive indices for sodium magnesium silicate fiber of 1.60–1.62 and for sodium cobalt silicate fiber of about 1.7. The mixed cobalt magnesium silicate fiber was shown by X-ray diffraction to be of the y-type.

EXAMPLE XIX

This example illustrates the preparation of sodium nickel silicate fibers of the y-type. The preparation was carried out as described in Example XVII, using a mixture containing 0.5 cc. of 1 M nickelous chloride solution, 1.25 cc. of water, 0.5 cc. of silica sol, and 0.75 cc. of 2 M sodium silicate solution. The product was a spongy mass of green fibers having the X-ray diffraction pattern characteristic of y-type fibers.

EXAMPLE XX

Sodium magnesium silicate fibers of the x-type were prepared by heating a mixture containing 96.2 g. of sodium silicate nonahydrate, 17.7 g. of silicic acid ($SiO_2 \cdot 15\%$ $H_2O$), 6.75 g. of sodium hydroxide pellets, 105 cc. of 25% (by weight) magnesium chloride solution, and 257 cc. of water at 530° C. for 6 hours under 2000 atmospheres pressure. The product was beaten with water in a high speed shearing-type mixer, beaten further in a colloid mill with water and finally dried by solvent interchange with methanol and benzene, followed by removal of the benzene by heating in vacuum at 50° C. The product was a fluffy mass of fibers, 49 g. of which was sufficient to fill a 1-gallon bottle. The product contained by analysis Na, 6.6; Mg, 15.82; Si, 28.63. The product consisted of ribbon-like fibers having a cross-sectional dimension in the range of 0.05–0.25 micron.

EXAMPLE XXI

This example illustrates the preparation of fluorine-containing x-type fiber. The preparation was carried out generally as described in Example XV at 580° C. under a pressure of 2000 atmospheres pressure for 6 hours, using a mixture containing 3.8 g. of sodium fluoride, 12.8 g. of sodium silicate nonahydrate, 3.36 g. of silicic acid ($SiO_2 \cdot 15\%$ $H_2O$)

22.6 cc. of 2 N sodium hydroxide solution, 14 cc. of 25% magnesium chloride solution, and 32 cc. of water. The product was a spongy mass of fibers which was washed with water and acetone, and air-dried. The product contained by analysis Na, 6.4; Mg, 15.85; Si, 28.20; F, 4.01. The fibers had a density of 2.91 g./cc. and a surface area of 41 sq. m./g.

EXAMPLE XXII

Fluorine-containing fibers of the x-type were prepared under conditions as described in Example XXI, using a mixture containing 21.2 g. of sodium fluoride, 96.2 g. of sodium silicate nonahydrate, 17.7 g. of silicic acid ($SiO_2 \cdot 15\%$ $H_2O$)

6.75 g. of sodium hydroxide pellets, 105 cc. of 25% magnesium chloride solution, and 257 cc. of water. The fibers were beaten as described in Example XX to give 49 g. of a very fluffy product. The composition by analysis was Na, 7.5; Mg, 15.47; Si, 27.45; F, 4.25.

EXAMPLE XXIII

Sodium cobaltous silicate fibers of the x-type were prepared from a mixture containing 1 cc. of 1 M cobaltous chloride solution, 0.18 cc. silica sol, 0.75 cc. of 2 M sodium silicate solution, and 1 cc. of water, by heating at 500° C. under 2000 atmospheres pressure for 4 hours. A mass of pink fibers was produced exhibiting the X-ray diffraction pattern characteristic of x-type fibers.

EXAMPLE XXIV

This example illustrates the preparation of fluorine-containing sodium nickel silicate fibers of the x-type. The preparation was carried out by heating at 700° C. under a pressure of 3000 atmospheres pressure for 6 hours in a sealed platinum tube, a mixture containing 0.5 cc. of 1 M nickelous chloride solution, 0.37 cc. of silica sol. 1.5 cc. of 2 M sodium silicate solution, 0.126 g. of sodium fluoride, and 0.6 cc. of water. The product was a spongy mass of fine green fibers showing the X-ray diffraction pattern characteristic of the x-type.

EXAMPLE XXV

Sodium magnesium nickel silicate fibers were prepared by heating together 10 cc. of 1 M magnesium chloride solution, 10 cc. of 1 M nickelous chloride solution, 22.2 cc. of silica sol, and 30 cc. of 2 M sodium silicate solution at 700° C. for 8 hours under 3000 atmospheres pressure. A spongy mass of light green fibers amounting to 3.3 g. was obtained. These fibers were shown by X-ray diffraction to be of the x-type and contained by analysis: Na, 5.7; Ni, 16.67; Mg, 7.4; Si, 25.4.

EXAMPLE XXVI

This example illustrates the conversion of x-type to y-type fibers.

A. Sodium magnesium silicate fibers of x-type were prepared according to the procedure of Example XV from a mixture of 96.2 g. of sodium silicate nonahydrate, 17.7 g. of silicic acid, 6.75 g. of sodium hydroxide pellets, 105 cc. of 25% magnesium chloride solution, and 277 cc. of water. The mixture was heated at 530° C. for 6 hours under 2000 atmospheres pressure. The fibrous product was shown to consist of x-type fibers by X-ray diffraction.

B. A portion of the above x-type fibers (1.6 g.) was heated with 20 cc. 1 N sodium hydroxide solution and 30 cc. of water at 700° C. for 6 hours under 3000 atmospheres pressure. The fibrous product amounted to 1.2 g. and consisted of y-type fibers as shown by X-ray diffraction.

The sodium metal silicate fibers of this invention can be twisted readily into the form of yarns and threads which are strong and pliable. The combination of toughness with thermal stability greater than that of asbestos exhibited by such threads makes them highly useful in fabrication of thermal and electrical insulation. Excellent properties are also found in papers prepared from the fibers of this invention (both x and y-types) which surpass paper products from chrysotile asbestos in tensile strength after heating to temperatures of 550–800° C. Bats of sodium metal silicate fibers make excellent filters and have been found especially effective in removing aerosol spray from gases. The fibers are also outstanding as reinforcing materials for plastics, as binders in paper products, as thickeners in paints, and in the formation of cermets. The products may contain fluorine, as indicated hereinbefore, and the fluorine-containing fibers are particularly useful in high temperature applications.

Since obvious modifications and equivalents in the invention will be evident to those skilled in the chemical arts, I propose to be bound solely by the appended claims.

The embodiments of the invention in which an exclusive property or privilege is claimed are defined as follows:

1. A silicate consisting essentially of (1) sodium, (2) hydrogen, (3) at least one divalent metal of the group consisting of cobalt, magnesium and nickel, (4) at least one member of the group consisting of hydroxyl and fluorine, (5) oxygen, and (6) silicon, in the proportions, on an atom basis per 8 parts of silicon, 1.5–3.0 parts of sodium, 0.2–2.0 parts of hydrogen (excluusive of hydroxyl hydrogen), 5.0–6.0 parts of divalent metal, 2.0 total parts of hydroxyl and fluorine, the hydroxyl and fluorine individually being in the amount of 0–2 parts, and 22 parts of oxygen exclusive of hydroxyl oxygen.

2. A silicate of claim 1 in crystalline form having an X-ray diffraction pattern containing reflections corresponding to $d$ spacings of 9.205, 2.612 and 2,520 A.

$$A. \pm 0.1 \text{ A.}$$

3. A silicate of the formula $Na_xH_yM_z(Si_4O_{11})_2X_mX'_n$, wherein the M's are at least one divalent metal of the group consisting of cobalt, magnesium and nickel, X and X' are selected from the group consisting of hydroxyl and fluorine, $x$ is 1.5–3.0, $y$ is 0.2–2.0, $z$ is 5.0–6.0, $m$ and $n$ are individually in the range of 0–2, $n+m=2$ and $x+y+2z=14$.

4. A silicate of claim 3 wherein $x$ is 2, $y$ is 2 and $z$ is 5.

5. A silicate of the formula

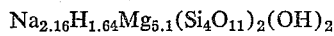
$$Na_{2.16}H_{1.64}Mg_{5.1}(Si_4O_{11})_2(OH)_2$$

6. A silicate of the formula

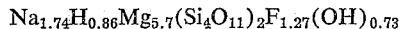
$$Na_{1.74}H_{0.86}Mg_{5.7}(Si_4O_{11})_2F_{1.27}(OH)_{0.73}$$

7. A silicate of the formula

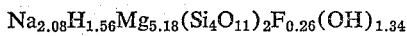
$$Na_{2.08}H_{1.56}Mg_{5.18}(Si_4O_{11})_2F_{0.26}(OH)_{1.34}$$

8. A silicate of the formula

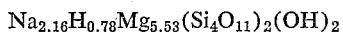
$$Na_{2.16}H_{0.78}Mg_{5.53}(Si_4O_{11})_2(OH)_2$$

9. A silicate of the formula

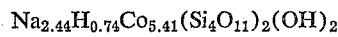
$$Na_{2.44}H_{0.74}Co_{5.41}(Si_4O_{11})_2(OH)_2$$

10. A fiber of a silicate of claim 1.
11. A fiber of a silicate of claim 2.
12. A fiber of a silicate of claim 3.
13. A fiber of a silicate of claim 4.
14. A flexible fiber of a single crystal of a silicate of claim 1.

15. The process of preparing a sodium silicate of claim 1 which comprises heating an aqueous mixture having a pH of at least 9 and containing the ions of sodium and of at least one divalent metal of the group consisting of cobalt, magnesium and nickel and silicate in the sodium: metal:silicate range of 2:1:1.5 to 8:1:8 at a temperature of about 300–900° C. and a pressure of at least 300 atmospheres for from about 10 minutes to about 100 hours.

16. The process of claim 15 wherein the divalent metal is magnesium, the temperature is about 300–600° C. and the pressure is about 500–2000 atmospheres.

17. The process of claim 15 wherein the divalent metal is magnesium, the temperature is at least 700° C. and the pressure is at least 2500 atmospheres.

18. The process of claim 15 wherein the divalent metal is nickel, the temperature is at least 700° C. and the reaction time is at least 6 hours.

19. The process of claim 15 wherein the divalent metal is cobalt, the temperature is not above about 500° C. and the reaction time is up to 1 hour.

20. The process of claim 15 wherein the aqueous mixture contains additionally the fluoride ion, the F:Si ratio being in the range 1:1–10:1.

21. A silicate of claim 1 in monoclinic crystalline form with a repeat distance along the longest crystalline axis ($c_0$) of 5.29 A.±0.1 A.

References Cited by the Examiner

UNITED STATES PATENTS 2,948,629    8/60    Shell _____ 23—110 X

OTHER REFERENCES

Ser. No. 259,213, Ludke (A.P.C.), published Apr. 27, 1943 (abandoned).

MAURICE A. BRINDISI, *Primary Examiner.*